TUBE BEADING AND EXPANDING TOOL AND METHOD

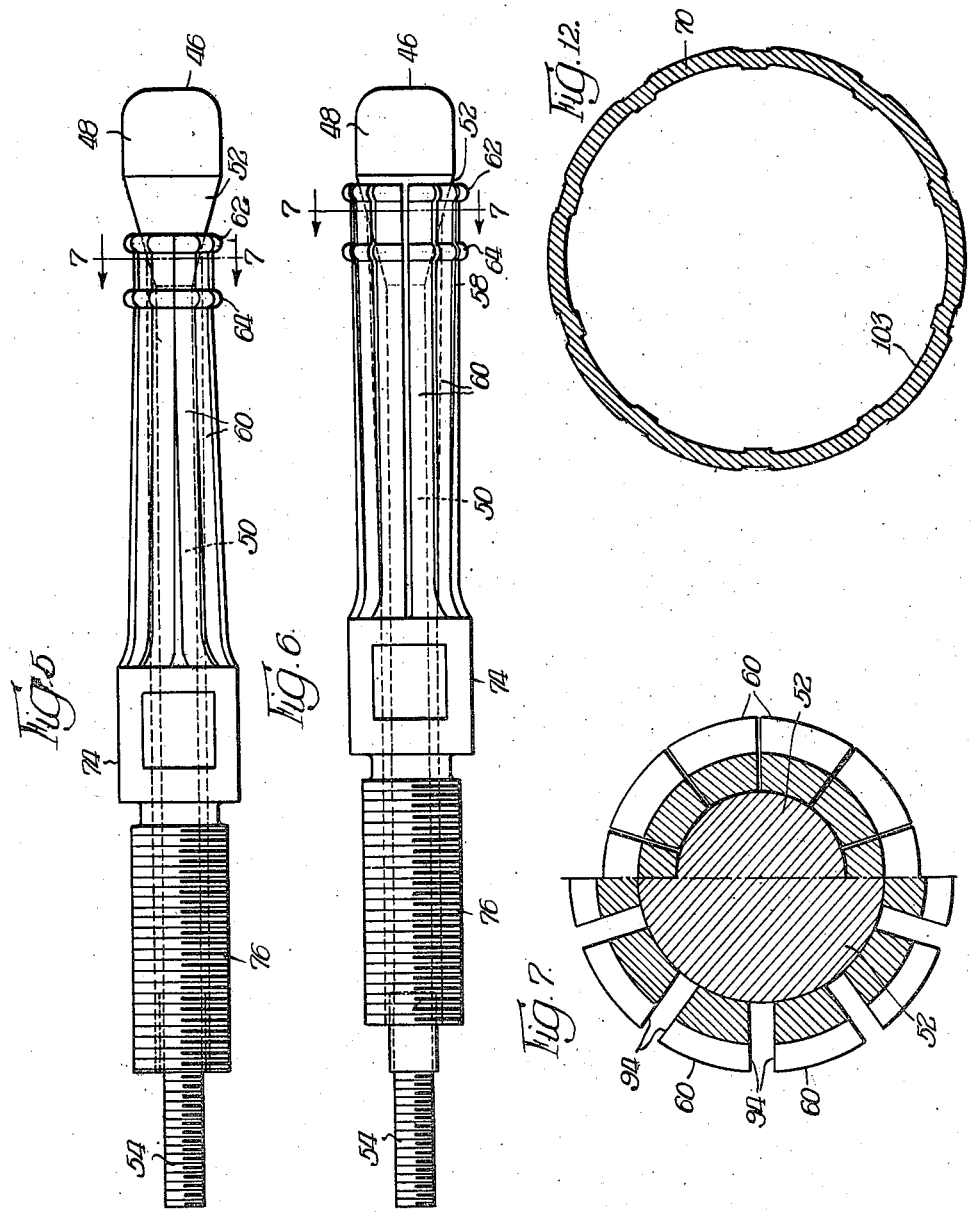

Aug. 6, 1946.   K. C. BUGG ET AL   2,405,399
TUBE BEADING AND EXPANDING TOOL AND METHOD
Filed Sept. 22, 1943   6 Sheets-Sheet 3
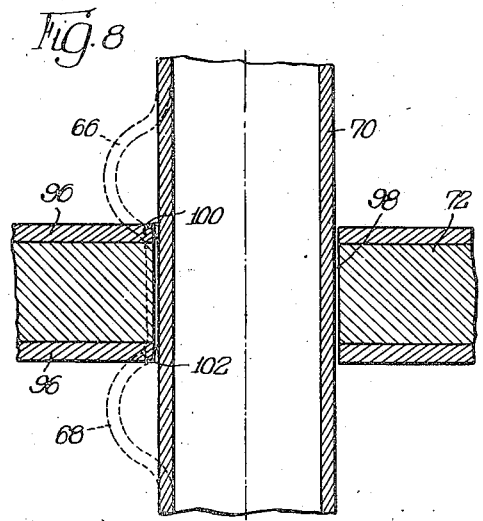
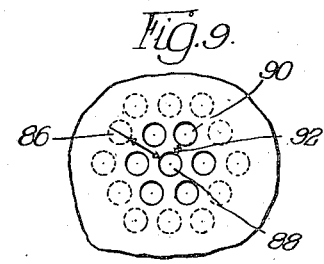
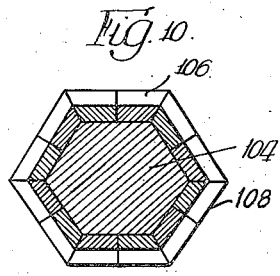
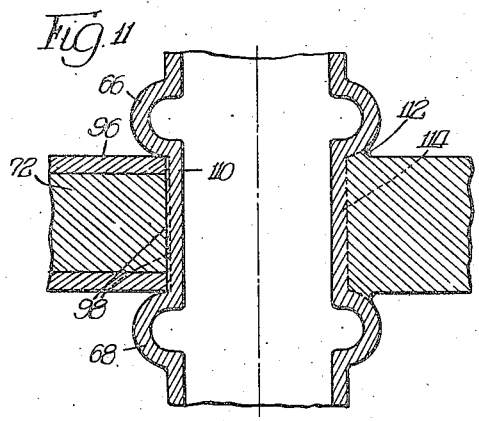
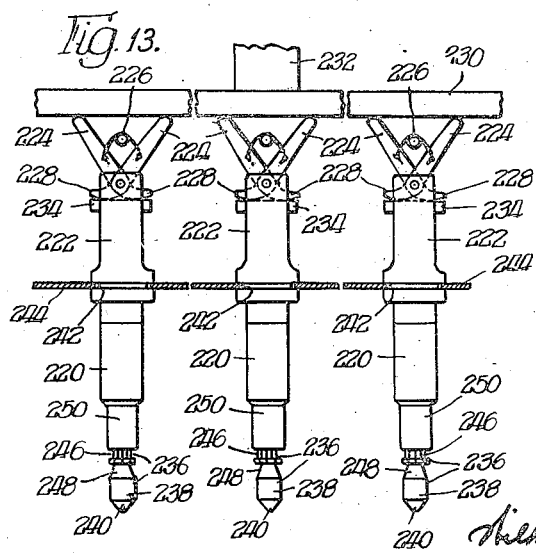
INVENTORS.
Kenly C. Bugg,
Harry L. Hart,
BY

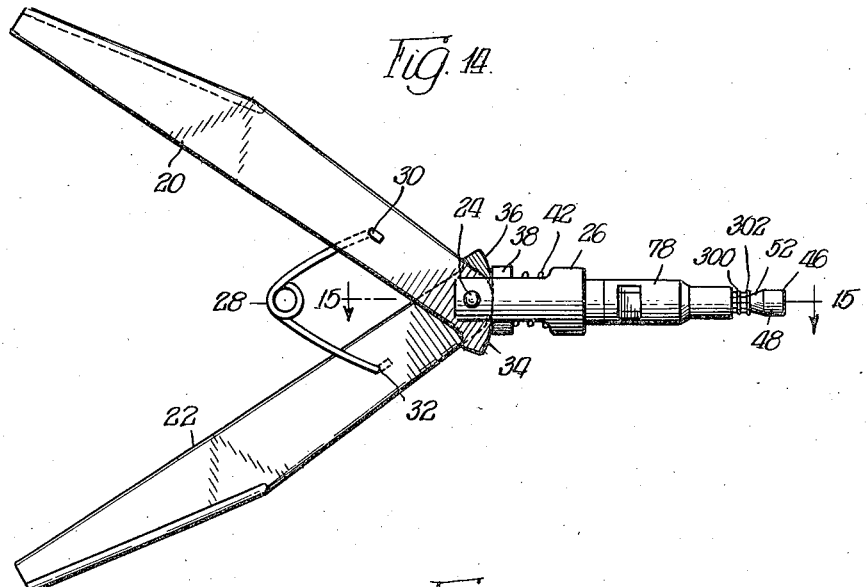
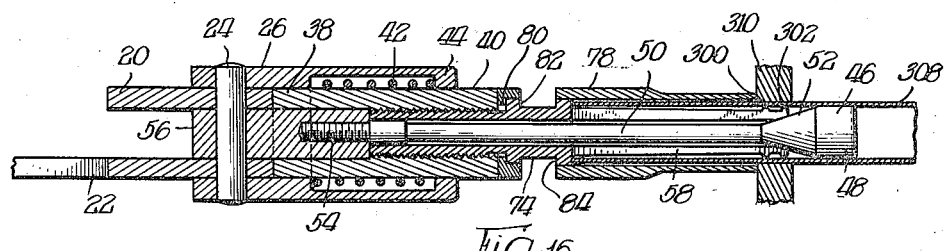
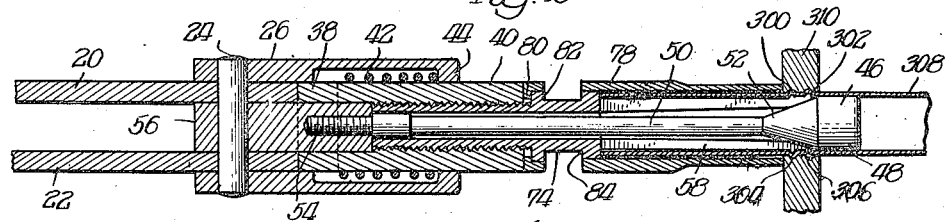
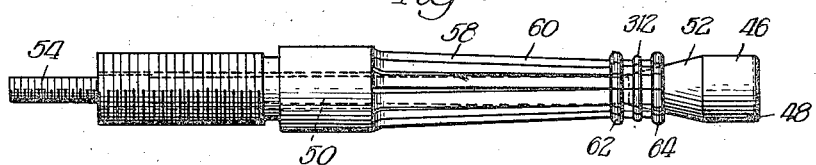

Aug. 6, 1946.     K. C. BUGG ET AL     2,405,399
TUBE BEADING AND EXPANDING TOOL AND METHOD
Filed Sept. 22, 1943     6 Sheets-Sheet 5
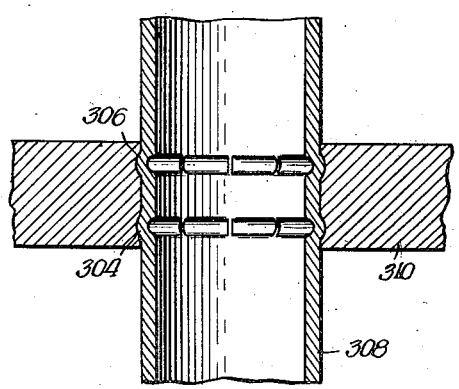
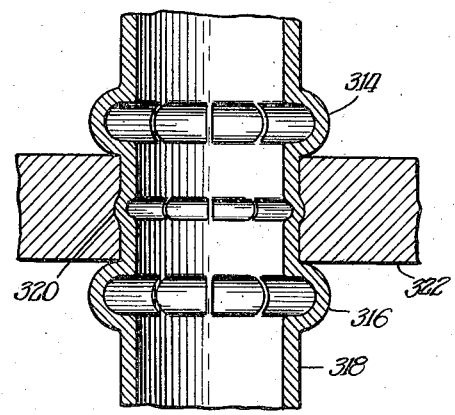
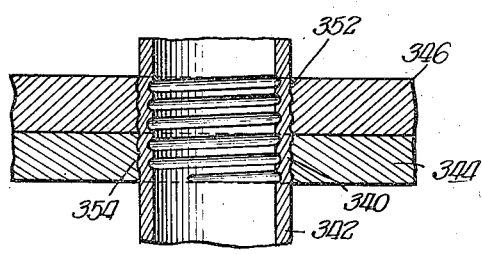
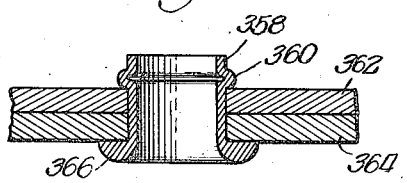
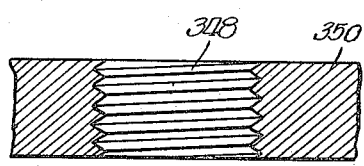
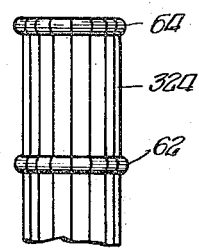
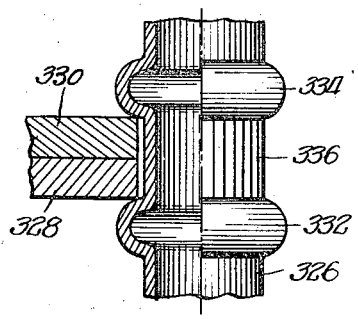
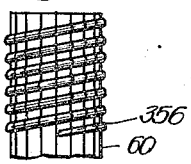
INVENTORS,
Kerly C. Bugg,
BY Harry L. Hart,

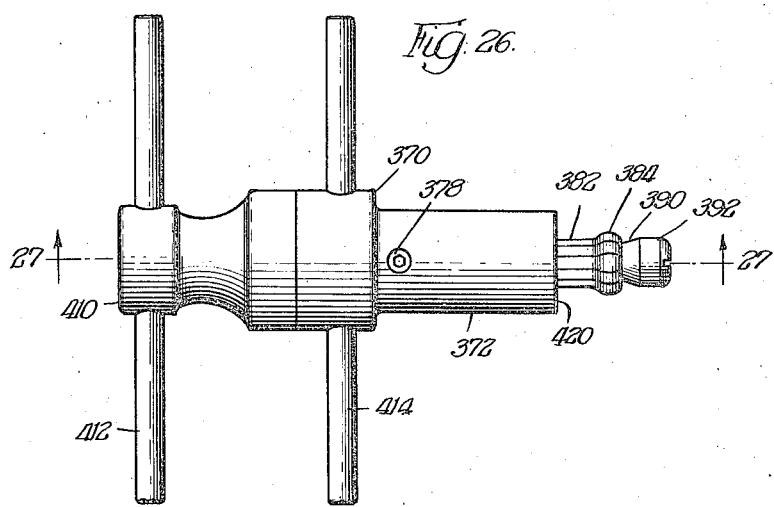
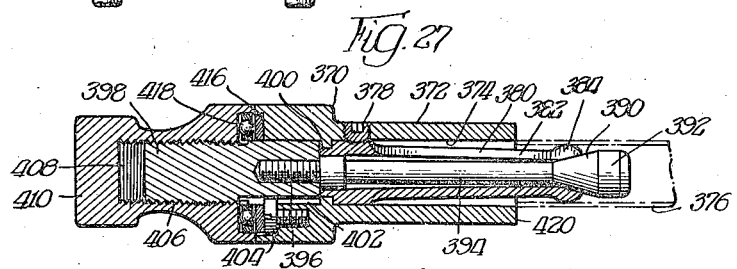
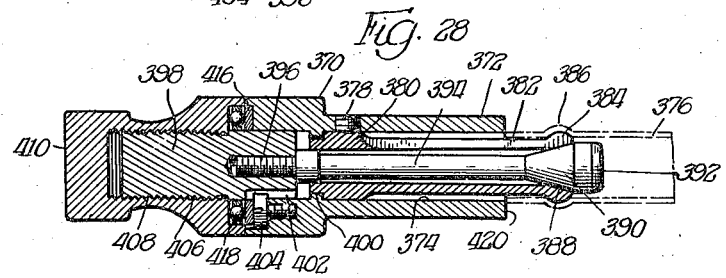
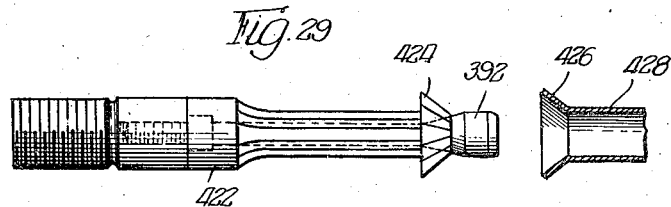

Patented Aug. 6, 1946

2,405,399

UNITED STATES PATENT OFFICE 2,405,399

TUBE BEADING AND EXPANDING TOOL AND METHOD

Kenly C. Bugg and Harry L. Hart, Fort Wayne, Ind.; said Hart assignor to said Bugg Application September 22, 1943, Serial No. 503,350

8 Claims. (Cl. 153—80)

This invention pertains to tube beading and expanding devices and methods and, more particularly, to devices and methods for beading and controllably expanding tubes of radiators and the like, for securing said tubes tightly in the holes of sheets or headers whereby they may be brazed thereto.

In the fabrication of certain articles it is frequently desirable to fasten tubes into sheets or to condition the tubes for brazing to sheets, such as in the manufacture of devices wherein tubes are secured to headers. Examples of the fabrication of such articles are the fabrication of radiators and other heat exchangers.

In some of these instances it is highly desirable and necessary to fasten for subsequent brazing very small diameter tubes of great number and having thin walls into headers. For example, such tubes may be placed very close together and upwards of 300 of such tubes of .210 inch O. D. may be placed in 16 square inches. Further, it is frequently desirable to use tubes having a section other than round, such as square, hexagonal, etc., and these must be fastened with exactness and must be tight.

The methods which have been employed use rubber dies, or hydraulic means or mechanical beading devices which merely form beads. In these instances the bead or flange formed in the tube on either side of the header cannot be exactly controlled, for brazing condition and at least an equally important consideration is the fact that the external wall of the tube by existing methods, as before mentioned, cannot be expanded and held to tightly fit the larger I. D. of the header holes. Thus there is no assurance that capillary attraction of the brazing material will cause a complete filling of the holes between the header and the tube, i. e., a filling from the edge of the hole to the bead and tube, and the wall of the hole and tube, and consequently there is the danger that the bead or flange will not be formed closely adjacent the header where they may be brazed. Thus there is danger of leakage, resulting in the rejection of the fabricated part. By the use of the hydraulic method or the rubber die method an inadequate joint may not only be formed, but it is very difficult to bead or flange any tube having a section other than round. Further, using either of these methods is objectionable in that there is danger that where the wall of the tube is not of uniform thickness or is not of uniform hardness, that there will be a distortion of the tube at the thin or weaker part, resulting in fracture or deformation of the tube to an extent where it may fail in test or service.

Where tubes are being handled having a section other than round, it is extremely difficult to form the angularly disposed walls into a proper bead. Likewise, the wear of the rubber die is extremely rapid.

In the use of the rubber die method where a plurality of beads are being formed, in order to even approximate uniform beads, the rubber die must be exactly uniform in resilience, which is extremely difficult to attain, particularly in small dies and if there is no uniformity, then the beads will not be uniform and the conformation will not be predictable.

Further, in the methods now being used, it is impossible to bead the tubes to the header in such a manner that they will tightly engage the adjacent parts of the header, so that it is practically impossible to braze the tubes by means of the material already applied to the header for brazing purposes. In addition to the above objections, the methods now in use are expensive, both from the standpoint of equipment needed therefor and from the standpoint of man hours for fabrication, as well as maintenance and replacement.

In the fabrication of radiators or other heat exchanging devices there frequently are a large number of tubes of small diameter used, and while they have substantially the same O. D. they still may vary somewhat in this respect. Further, the holes in the headers for receiving the tubes may vary somewhat. Even though such conditions may exist, the tubes must be tightly secured to the headers or leakage will occur.

It is, therefore, an object of this invention to provide an inexpensive device capable of controllably forming uniform beads or flanges with extreme rapidity.

Another object of the invention is to provide a device for forming beads or flanges in tubes of any cross-sectional shape and with little appreciable wear on the tool.

A further object of the invention is to provide a tool for beading or flanging a tube to a plate or header in such a manner that the bead or flange is properly disposed with respect to the plate or header, whereby the bead or flange can be readily and quickly brazed to the plate or header through brazing material usually applied thereto.

A still further object of the invention is to provide a tool for forming a bead or flange after application of the tube to a header or other plate, the bead or flange being so formed as to grip the plate or header and also that portion of the tube filling the hole in the header is disposed into tight engagement with the header, even to the extent of slightly expanding the hole during formation of the bead. This is particularly important where such material as aluminum is being used. For example, if hard tubes were being expanded, there is danger that the material of the tube would spring back away from the header so as actually to have a loose condition, but where not only the tube is expanded but also the wall of the hole of the header is expanded, the spring-back condition is so nearly uniform as to preclude any such loosened condition.

A yet further object of the invention is to provide a tool which is so constructed and arranged that the tube to be applied to a header, junction box or plate may be applied to the tool and piloted by it into position after which it may be set.

Another further object of the invention is to provide a tool for beading tubes to headers, plates, junction boxes and the like, the tool being provided with pilot or supporting means which will uniformly dispose or position the tube, and where double headers, junction boxes, plates and the like are used this tool provides automatic spacing means for the plates, junction boxes or headers.

A different object of the invention is to provide a tool for beading, flanging and the like, the tool including a plurality of expanding dies, the dies being so constructed and arranged, one with respect to the other, that in their expanded or working condition they conform to the true shape of the tube to be flanged, as well as to the bead or flange. For example, if a round bead is to be formed, the die parts in expanded position assume a true circular shape.

Still a different object of the invention is to provide a tool for beading, flanging and the like, said tool including an expandable die comprising a plurality of parts, the parts being initially formed in the size of the flange, bead and tube, and then collapsed to a position where there is substantially no space between adjacent fingers of the die and the die may be readily inserted into the tube for the beading or flanging operation.

Yet a different object of the invention is to provide a tool for beading or flanging a tube into a header, the bead or flanges being so positioned after formation that the beads or flanges actually pinch the brazing material on the header, whereby perfect brazing is assured.

Another further object of the invention is to provide a simple, light, sturdy and inexpensive portable tool for beading or flanging tubes or other cylindrical or tubular members applied as repair or replacement parts.

Another object of the invention is to provide a tool for securing means for joining plates or other articles together.

Another object of the invention is to provide a device for beading or flanging tubes into headers or the like to form radiators, condensers or the like, which device is so constructed and arranged that the operation of the tool furnishes means whereby the headers are specifically related or positioned with respect to the baffles within the radiator, condenser or the like, that is, the beading of the tubes causes the headers to be pulled toward the baffles, and inasmuch as all of the tubes are beaded uniformly, the headers are specifically moved toward the baffles in a predetermined manner assuring an adequate contact between baffles and headers.

Another object of the invention is to provide a tool for tightly securing tubes to headers, which tool is operative even though there may be slight variations in the tubes handled or in the holes of the headers receiving said tubes.

Another object of the invention is to provide a device for cold beading or flanging tubes.

Another object of the invention is to provide a device which is so constructed and arranged that any type of bead, flange or key may be formed thereby.

Another object of the invention is to provide an inexpensive portable tool for cold forming a bead or a flange on means such as tubes, eyelets, bushings or other fastening or bearing means.

An object of the invention is to provide a device for profiling or forming articles for the reception of complementary interfitting means of other articles, such as the formation of a screw thread for the reception of a complementary screw thread.

Another object of the invention is to provide a device for cold fastening or securing tubes to headers and the like, wherein the tube is so tightly secured that it is not necessary to braze or otherwise secure the tube to the header, whereby lighter tubes and headers may be used to thereby increase the efficiency of coolers and the like formed thereby.

Another object of the invention is to provide a tool for cold setting or fastening tubes to headers or the like so tightly that they need not be brazed, the tool making possible, in the case of radiators, such as airplane radiators, the assembly and permanent fastening of the headers, muffs, covers, etc., and thereafter applying and fastening in place the tubes cold. By following this procedure the lightest parts are applied last, namely, the tubes, thus lessening the chance of distortion or otherwise weakening these members, thereby decreasing leakage possibilities.

With these and various other objects in view, the invention may consist of certain novel features of construction and operation as will be more fully described and particularly pointed out in the specification, drawings and claims appended hereto.

In the drawings which illustrate an embodiment of the device and wherein like reference characters are used to designate like parts—

Figure 5 is an enlarged elevation of the quill of the tool shown in Figures 1 to 4, the die fingers being shown in collapsed or inoperative position;

Figure 6 is an enlarged elevation of the quill shown in Figure 5, the same showing the die fingers in operative or bead forming position;

Figure 7 is an enlarged fragmentary sectional end elevation showing the die fingers in collapsed and in bead forming positions, the right hand part showing the former and the left hand part showing the latter, the sections being taken substantially in the planes as indicated by the lines 7—7 of Figures 5 and 6.

Figure 8 is an enlarged, fragmentary sectional elevation showing a tube in position to be beaded to a header, the dotted lines illustrating the disposition of the tube after beading, whereby the header is pinched by the tube;

Figure 9 is a fragmentary plan view showing the relative position of the holes of a header around a hole;

Figure 10 is an enlarged sectional elevation, corresponding to the upper section of Figure 7, showing the die of a quill adapted for use in connection with securing a tube which is a regular hexagon, the same showing the fingers of the die in collapsed position;

Figure 11 is an enlarged fragmentary sectional elevation through a tube and header fastened by the device which is the subject matter of this invention, the left hand portion of said figure showing the tube prior to brazing, and the right hand section of said figure showing the tube subsequent to brazing;

Figure 12 is an enlarged fragmentary plan view (somewhat exaggerated) showing a tube after it has been secured to a header;

Figure 13 is a (more or less diagrammatic) fragmentary side elevation of a device embodying the invention for simultaneously beading a plurality of tubes;

Figure 14 is a plan view, corresponding to Figure 1, of a modified form of beading tool embodying the invention;

Figure 15 is an enlarged fragmentary sectional elevation, corresponding to Figure 3, showing the device shown in Figure 14 within a tube to be beaded, the same being taken substantially in the plane as indicated by the line 15—15 of Figure 14;

Figure 16 is an enlarged fragmentary sectional elevation, corresponding to Figure 15, showing the parts of the tool (of Figure 14) in position after beading the tube;

Figure 17 is an enlarged elevation of a modified form of quill for a tool such as shown in Figures 1 or 14, the same showing die fingers in collapsed position;

Figure 1:
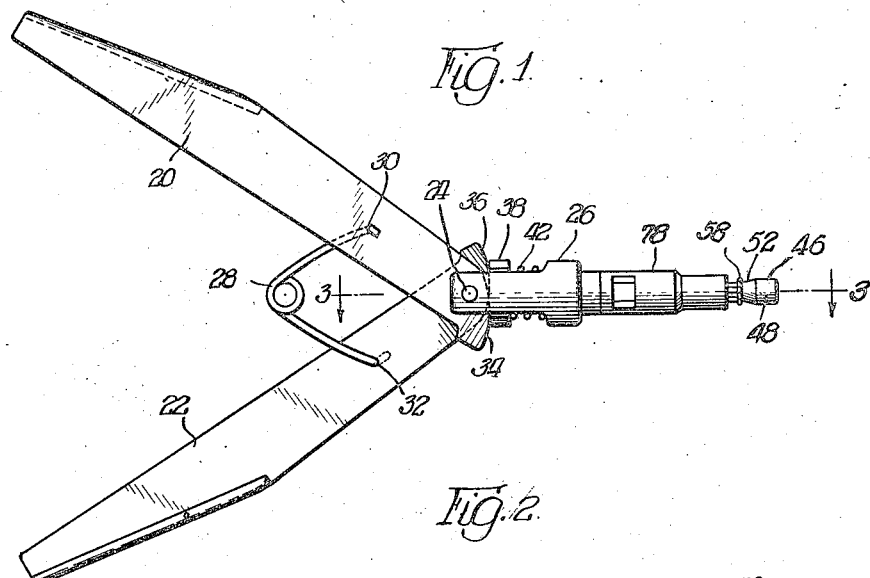
Figure 1 is a plan view of a beading tool embodying the invention, the same showing the die fingers in collapsed or inoperative position.
Figure 2:
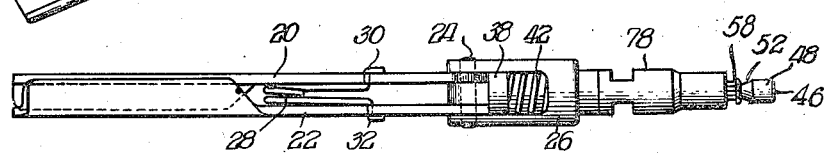
Figure 2 is a side elevation of the tool shown in Figure 1.

Figures 18 to 21 inclusive, are enlarged fragmentary sectional elevations showing different forms of connections between tubes and headers, sheets and the like;

Figure 22 is a fragmentary elevation of a quill for forming threads in a tube or plate as shown in Figures 20 and 25;

Figures 23 is a fragmentary elevation of a quill for forming the beads and serrations shown in Figure 21;

Figure 24 is an enlarged fragmentary sectional elevation showing an eyelet connecting two sheets, the eyelet having been set by a tool embodying the invention;

Figure 25 is a fragmentary sectional elevation showing threads formed by a tool embodying the herein inventions;

Figure 26 is a side elevation of a modified form of tool for beading tubes showing the quill in inoperative position;

Figure 27 is a sectional elevation taken substantially in the plane as indicated by the line 27—27 of Figure 26, showing the quill or die fingers in inoperative position with respect to a tube;

Figure 28 is a sectional elevation, corresponding to Figure 27, showing the die fingers in position after having beaded a tube; and Figure 29 is an enlarged elevation of a modified form of quill for the tool shown in Figures 26 to 28, the same being adapted for flaring.

This application is a continuation-in-part of application Serial No. 490,042, filed June 8, 1943, for Tube beading and expanding tool.

The tools illustrated herein are for forming beads, threads, keys, flanges or the like on tubes or other members, it being understood that the same principles may be applied to a tool wherein a plurality of quills or forming dies are provided.

The tool illustrated in Figures 1 to 4, and 14 to 17, inclusive, comprises essentially a pair of handles 20 and 22 pivoted as at 24 to yoke 26, said handles being normally urged apart by means of the spring 28, secured to said handles as at 30 and 32. The handles are provided with the cams 34 and 36 adapted to engage and reciprocate the head 38 of the die actuating shaft 40, a spring 42 being interposed between the head 38 and the end 44 of the yoke 26, normally urging the head 38 toward the left as viewed in Figures 1 and 14, that is, toward inoperative position.

The quill shown in Figures 5, 6, 7, 17, 22 and 23 (for use with the devices shown in Figures 1 to 4, 13, and 15 to 17) comprises two members, one of said members, the cam plunger 46, comprising a cam head 48 connected to the stem 50 through the frusto-conical surface 52, the end of the stem 50 being threaded or otherwise secured as at 54 to one end of the link 56 which is pivoted at its opposite end at 24. The other member of the quill, that is, the die 58 comprises the elongated die shoes or fingers 60 having bead forming members or ridges 62 and 64 (Figures 1 to 7), said members being spaced apart the proper distance to form the beads 66 and 68 whereby said beads are determined by the thickness of the tube 70 on which the beads are formed and by the thickness of the header 72 to which the tubes are to be secured. In the case of the fingers shown in Figures 14 to 16, the ridges 300 and 302 are so disposed that the beads 304 and 306 formed thereby in tube 308 are depressed in the adjacent header 310 to interlock therewith (see also Figure 18).

The fingers of the quill shown in Figure 17 are provided with spaced ridges 62 and 64 (or 300 and 302) between which is the ridge 312 so that beads 314 and 316 (similar to beads 66 and 68) are formed in tube 318 between which beads, the bead 320 is formed, depressed into header 322 (Figure 19).

The fingers of the quill shown in Figure 23 are provided with the ridges 62 and 64 (or 300 and 302) between which extend the serrations 324 (or serrating ridges) so that the tube 326 when beaded with respect to plates 320 and 328 not only disposes the beads 332 and 334 on each side of said plates (or depressed therein, depending on the spacing of the quill ridges) but also depresses or interlocks serrations 336 into said plates.

The quill shown in Figure 22 is provided with a ridge 356 having a lead which forms the lead bead 340 (Figure 20) in tube 342 adapted to tightly join the plates 344 and 346, after which the tube may be cut on each side of said plates. By forming the ridges with a sharp crest, a thread 348 may be formed as in plate 350 (Figure 25) it being understood that it is only necessary to give the tool a partial turn in order to make the bead continuous.

The die fingers project from a head 74 which is threaded or otherwise secured as at 76 to the actuating shaft 40. A positioning shell, housing member or sleeve 78 is provided having an inner diameter sufficient to accommodate the tube 70 (308) when it is slipped over the cam plunger 46 and the die shoes 60, the sleeve 78 being provided with the internal flange 80 adapted to be retained between the flange 82 of the head 74 and the die actuating shaft 40. The position of the outer end of the sleeve 78 with respect to the ridges 62 and 64 properly determines the disposition of the beads with respect to the header. The head 74 is also provided with the flange 84 which may provide seating means for the tube 70 limiting the innermost position of the tube with respect to the positioning shell or sleeve.

In forming the die fingers 60, it has been found desirable to provide as many fingers as possible, provided the width of the fingers is not too small that they would cut into the tube being beaded. The number of fingers should not be too small, because they would then tend to disrupt or weaken the tubes beaded, because too much metal of the tubes would be moved locally or from a single source while the beading operation was being performed. Further, if the sections were too large, when the bead was formed there would be too much space between the adjacent fingers in their expanded position such as shown in Figures 6 and 7. Figure 9 shows the relative position of apertures in the header and by referring to this figure it will be seen that there are six apertures surrounding each single aperture, except, of course, around the edges. Under this condition it will be seen that radially outwardly of the line 86 taken from aperture 88, there is a thick wall, whereas radially between adjacent apertures 88 and 90 as along line 92, there is a relatively thin wall. Thus it will be seen that the number of fingers should preferably be at least six. Further, an even number of fingers is preferable to properly control the beads, as the fingers then oppose each other in expanding so that they do not tend to distort the beads.

In forming the fingers, therefore, a sleeve such as shown in the left hand part of Figure 7 is cut out or slotted as at 94 to form the fingers 60, the fingers then being parallel. This sleeve has an O. D. preferably just slightly larger than the I. D. of the tube for which the die is to be used. Sections of this sleeve perpendicular to its longitudinal axis, and also of the ridges 62 and 64 thereon are circular. After the slotting as at 94, the fingers 60 are collapsed as shown in the right hand part of Figure 7, and the fingers then are heat treated to impart resiliency thereto. After this is done, of course, the fingers tend always to return to the collapsed position as shown in the right hand part of Figure 7, and in this inoperative position the edges of the fingers tightly contact so that in this position they are within the internal diameter of the tube.

Figure 3:
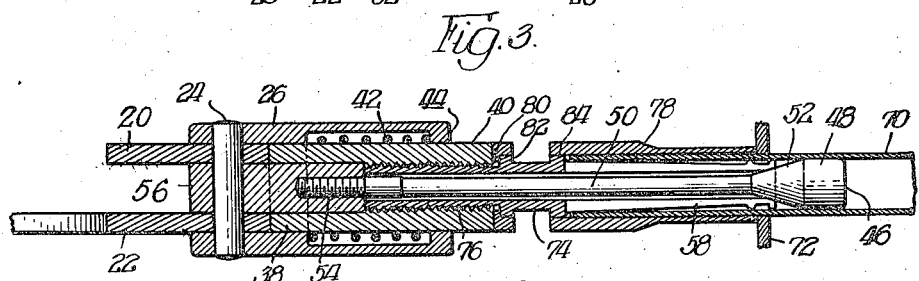
Figure 3 is an enlarged, fragmentary sectional elevation of the tool shown in Figures 1 and 2 showing the same positioned within a tube to be beaded to a header, the same being taken substantially in the plane as indicated by the line 3—3 of Figure 1.
Figure 4:
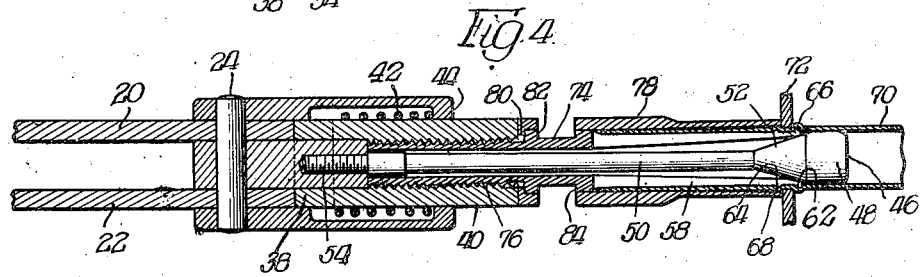
Figure 4 is an enlarged fragmentary sectional elevation corresponding to Figure 3 showing the parts of the tool in position after beading the tube.

In Figure 8 there is shown a header 72 on which brazing material 96 is disposed. The tube 70 is disposed through the aperture 98 of the header. The quill is then inserted such as shown in Figure 3 and the handles 20 and 22 are moved toward each other about the pivot 24 against the spring 28. This movement of the handles 20 and 22 will cause the head 38 to move toward the right as viewed in Figure 1 which in turn causes movement of the fingers 60 toward the right. This movement of the fingers 60 causes the outer ends of said fingers to ride on the frustoconical section 52 of the cam plunger 46, causing the fingers to be spread out as shown in Figures 4 and 6 and the left-hand part of Figure 7, thereby causing outward movement of the ridges 62 and 64 which in turn causes the beads 66 and 68 to be formed as shown in Figure 4 and by the dotted lines in Figure 8. This outward movement of the fingers also causes the metal between the bead forming members 62 and 64 to be moved outwardly and the wall forming the holes 98 actually moves outwardly, thus compressing the tube against the walls of the hole and causing the brazing metal and header to be pinched as at 100 and 102 by the beads 66 and 68. The tube then is tight in the holes of the header and mechanically tight thereto, even though there may be a slight return of the molecules of metal in the tube and header. The slight return of the molecules of metal in the tube and header has been found to be substantially the same so the joint remains tight. Further as the fingers are somewhat spaced when in expanded position, as shown in the left-hand part of Figure 7, the tube is, in effect, splined to the header, as the fingers cause the metal of the tube 70 (Figure 12) to be indented as shown at 103. This further aids the joint as it prevents relative rotation between the tube and header prior to brazing. The handles 20 and 22 may then be released, the spring 42 causing the head 38 to be moved toward the left, as viewed in Figure 1, thus permitting the fingers to ride down the surface 52 to cause the fingers to be moved to their inoperative position, such as shown in Figures 3 and 5.

The tool can then be dissociated from the tube and the tubes and header can be brazed, causing the brazing material to flow to form a tight joint between the beads and the header. This brazing operation is effective, inasmuch as the tubes are tight in the hole and bearing 360° on the brazing material, it being known that if the tubes are loose, in other words, if there is any break between the bead and the header or brazing material thereof, said brazing material will not be effective to form a tight joint between the tube and the header.

Although a tool is shown with mechanical handles and only one quill, it is understood that other actuating means such as a piston, may be used and quills may be operated simultaneously and in multiples.

In Figure 10 there is shown a sectional plan view of a quill for use with tubes of hexagonal section, the quill comprising the cam plunger 104, and the adjacent die 106, said die being similar to the die 58, and comprising the fingers 108. Inasmuch as Figure 10 shows the die in collapsed position, the hexagon formed may not be a true geometric figure (regular hexagon), as in cutting commercially to form the fingers the cuts may not be exact, but the fingers do assume such a shape, or the shape to conform to that of the tube when expanded in a manner similar to the die 58 such as shown in Figure 6.

The left hand section of Figure 11 shows a tube 70 after it has been beaded as at 66 and 68, and the wall 110 between the beads expanded to tightly fit the face of the hole 98 of the header 72, the brazing material being shown as at 96. In expanding the wall 110, the hole is moved from the dotted line position to the full line position, and when the tool is removed both the face of the hole and the wall of the tube may move slightly.

Brazing may then be effected as shown on the right hand side of Figure 11, the brazing material flowing (upwardly and downwardly as viewed in said figure) toward the beads as illustrated at 112 and flowing between the face of the hole of the header and the wall of the tube between the beads as indicated at 114, thereby insuring a complete brazing or securing of the tube to the header. Further, with the device illustrated, the stretching between and at the beads is equal whereby no weak spots in the tube are formed.

With the methods now in use it has been found that the formation of the beads of the tube adjacent the header causes an inward pulling of the wall of the tube between the beads, thus causing a space to occur between the face of the hole of the header and the wall of the tube within the hole. When brazing is then effected a joining will occur at the bead, but a space between the face of the hole of the header and the wall of the tube will not be completely closed, thereby leaving a weakened joint which is susceptible of fracture in use because any pressure tends to bulge outwardly the wall of the tube between the beads, thus tending to pull (loosen) the beads from the brazed joints, and if the space is large enough no proper joining will occur. Further, as the beading is not exactly controllable (with the present used methods) the walls of the tube adjacent and at the beads are unequally thinned, which leaves a condition whereby the tube is subject to pressure failures.

By varying the shape of the ridge 64 and the position of the positioning shell 78, the tube may be flanged or flared by the ridge instead of beaded.

In beading tubes of some devices, such as, for example, radiators of airplanes and the like, it may be desirable to bead a plurality of the tubes to the headers in one operation instead of beading the tubes separately. In this event a device such as shown in Figure 13 may be used. In this device a plurality of beading mechanisms may be used as indicated at 220. Each of the mechanisms comprises a yoke 222, similar to yoke 26, to which are pivoted the handles 224 urged together by means of the spring 226. The handles are provided with the cams 228 which move downwardly when the handles are spread apart, the handles being spread apart by means of the cross head 230 operated uniformly by the operating mechanism or control 232. The cams 228 are so arranged that each cam is on the same side of the pivot as the handle which moves it. Thus these cams 228 are oppositely disposed with respect to cams 34 and 36 as cam 34 is operated by handle 20 while cam 36 is operated by handle 22. This would have to be reversed in Figure 13. The cams 228 reciprocate the head 234 of the die-actuating shaft, which is similar to the shaft 40. Of course, the handles may be eliminated and other means used to depress the heads 234, or plungers may be interposed between the cross head 230 and heads 234.

A spring similar to spring 42 is interposed between the head 234 and the end of the yoke 222 (corresponding to yoke 26), normally urging the head upwardly, as viewed in Figure 13, that is, toward inoperative position. A quill 236 is provided similar to the quill shown in Figures 5 and 6, with the exception that the cam head 238 is provided with the conical portion 240 for finding the way of or guiding the quills into the tubes to be beaded, it being seen that the yokes are floated (or resiliently floated) as at 242 to the support 244 i. e. they are loosely mounted to have restricted relative movement with respect to support 244 and with respect to each other. Each quill is provided with the elongated die shoes or fingers 246, similar to the fingers 60, and the operation thereof is similar, as said fingers 246 are spread apart by means of the frusto-conical portion 248 of the cam head.

In the operation of this device, it is moved into the tubes, the conical portions 240 of the individual mechanisms finding their way into the tubes a proper distance, the tubes being received within the positioning shell or sleeve 250, the end of said sleeve abutting the header for positioning the mechanism so that the beads will be properly formed as at 66 and 68 (Figure 4). Operation of the control 232 causes the cross head 234 to move downwardly whereby the cams 228 will cause the head 234 to move downwardly to move the fingers 246, causing said fingers to move outwardly due to their movement on the frusto-conical portion 248, thus causing the ridges similar to ridges 62 and 64 to bead simultaneously the tubes in which these members are engaged.

In setting a tube with the tool illustrated in Figures 14 and 15 it will be seen that the projections 300 and 302 are spaced apart a distance less than the thickness of the sheet or header 310. This provides a convenient method of fastening where the hole depth is great or where it is desired to cut one side of the tube off flush with one face of the header. Operation of the tool is similar to that already described with respect to Figures 1 to 4 inclusive, wherein operation of the handles 20 and 22 causes the cam plunger 46 to be moved toward the left as viewed in Figure 15, to the position as shown in Figure 16, the frusto-conical portion 52 of said cam plunger causing the fingers to be spread outwardly forming the beads 304 and 306 on the tube 308 and causing said beads to extend or be pressed into the metal of the header. Release of the handles of course causes the spring 42 to move the plunger 46 from the position illustrated in Figure 16 to that illustrated in Figure 15, whereupon the tool may be withdrawn from the tube. Thereafter the tube may be cut off flush with the surface of the header if desired.

Figure 18 illustrates in enlarged section that the beads 304 and 306 extend into the wall of the header 310. By the use of the quill illustrated in Figure 17, the tube is beaded as illustrated in Figure 19, wherein the beads 314 and 316 are formed on each side of the header 322, similar to the beads 66 and 68, and an additional bead 320 is formed by the ridge 312 of the fingers 60 intermediate the beads 314 and 316, the bead 320 extending into the metal of the header.

In Figure 20 there is shown a tube 342 extending through aligned apertures 352 and 354 provided in the plates 346 and 344. In this case a quill is used such as shown in Figure 22 wherein the shoulder 356 disposed on the fingers 60, for forming the bead 340 is disposed as a helix or in the form of a screw thread. In this case a threaded bead 340 is formed in the tube 342, the bead extending into the metal of the plates 344 and 346, and due to the fact that they are formed as a screw thread they only intersect the joint between the plates at substantially a point whereby there is no tendency to separate the plates while the bead is being formed, yet an exceedingly tight joint is effected between the plates. Thereafter, of course, the tube 342 may be cut on either or both sides to cause it to be flush with either or both outer surfaces of the plates. In this event, of course, a fastener would be formed. The thread may either be interrupted by the space between quills or may be made continuous by partially rotating the quill.

In Figure 24 the eyelet 358 is formed with the bead 360, similar to the bead 66, pinching the two plates 362 and 364 toward each other, whereby they are tightly held between the bead 358 and the head 366 of said eyelet. A tool with one shoulder may be used, such as will be later described (Figures 26 to 28) or the quill similar to Figures 5 and 6 may be used.

In Figure 25 the plate 350 is shown and a tool is used similar to the tool used to form the threads in the construction illustrated in Figure 20, that is, the quill is formed with ridges in the form of a screw thread (Figure 22), and said quill is directly applied in the hole 348 of said plate to form the threads. It is only necessary when the quill is expanded to slightly rotate the quill to form a continuous thread and in this instance a quill having sharp crest forming ridges is used.

In the modification shown in Figures 26 to 28 inclusive, a simple tool 370 is provided for forming beads on tubes, the tool being particularly adapted for forming beads on relatively thick walled tubes. The tool 370 comprises the positioning shell body or sleeve 372, provided with the internal bore 374 for receiving the tube 376. The sleeve is provided with fastening means 378, for securing the die 380 in position with respect to said sleeve, the die being similar to that illustrated in Figures 1 to 4 inclusive, comprising the spring fingers 382. Inasmuch as only one bead is to be formed, the fingers are provided with a single ridge 384 for forming the bead 386 in the tube 376. The end of the fingers are provided with the complementary frusto-conical surface 388, engaging the frusto-conical surface 390 of the cam head 392.

The cam head is provided with the stem 394 (thereby forming a cam plunger) extending through the bore of the fingers or die, and being threaded or otherwise secured as at 396 to the cam controlling or actuating member 398. The die is positioned by means of the shoulder 400 prior to securing by means of the fastening means 378. The cam controlling or actuating member is slotted as at 402 and prevented from rotating by means of a key taking the form of the screw 404. The key, however, does not prevent sliding or axial movement of the actuating member for actuating the cam plunger. The actuating member 398 is threaded as at 406, said threads being engaged by the complementary threads 408 of the rotatable operating member 410 which may conveniently be provided with the handles 412. Handles 414 may also be provided on the sleeve 372 for convenience of operation. The sleeve 372 is provided with the race 416, on which the anti-friction bearings 418 of the operating member 410 roll.

Assuming that the device is in the position as illustrated in Figure 27, that is, in inoperative position and it is desired to form the bead 386 on the tube 376, the tube is placed in position where it abuts the end stop 420 of the shell body 372 and the handle 412 is rotated, rotating the operating member 410. Rotation of the operating member 410 causes the cam control member 398 to be moved toward the left from the position shown in Figure 27 to that shown in Figure 28 by means of the threads 408 and 406, causing the surface 390 to be drawn toward the left to separate the fingers 382 causing the bead 386 to be formed by the ridges 384 of the fingers. Rotation of handle 412 in the opposite direction releases the fingers, permitting them to collapse to inoperative position.

Figure 29 illustrates a quill 422 similar to quill 380 but wherein the ridges 424 are formed as a frusto-conical surface, whereby operation of the cam head 392 will cause the flange 426 to be formed on the tube 428, it being understood of course that the relative dimensions between the quill and the positioning shell or body are such that the end of the shell provides a stop 420 for the tube, and the ridges 424 are closely adjacent to said stop.

With the devices herein shown tubes may be set cold or may thereafter be brazed, depending on the specifications to be followed. However the setting tools are such that especially where set cold, a tight joint is effected. Quills may readily be replaced, and a slight expansion of the hole into which the tube is set makes possible a surface contact (or interlocking) between the tube and header and a controlled joint.

It is to be understood that we do not wish to be limited by the exact embodiments of the device shown, which are merely by way of illustration and not limitation, as various and other forms of the device will, of course, be apparent to those skilled in the art without departing from the spirit of the invention or the scope of the claims.

We claim:

1. In a device of the character described, the combination of a plurality of quills comprising die means having separate die members urged toward each other, means for floatably supporting certain of said quills with respect to other of said quills, and means movable to separate simultaneously the die members of said quills.

2. The method of making a quill for expanding a tubular article which comprises forming a die portion on the quill of the desired shape and with an O. D. substantially equal to the diameter of the quill in its expanded position, splitting the die portion and a portion of the quill into a plurality of oppositely disposed substantially parallel fingers, contracting said fingers to an O. D. where they will be readily insertable into the member upon which the die portion is to operate, and treating said quill to impart resilience to said fingers whereby they tend to return to their contracted positions.

3. In a device for forming beads on tubes extending through holes in a header or the like, the beads to be formed on each side of the header, the combination of a yoke member, a die actuating shaft slidably mounted in said yoke, actuating means pivoted to said yoke and having a cam member movable to move said shaft in a direction away from the pivot, resilient means urging said shaft toward said pivot, a link pivoted to said pivot and extending within said shaft, a positioning member secured to said shaft, and a quill disposed within said positioning member, said quill comprising a die member secured to said shaft, said die member being composed of die fingers integrally connected adjacent one of their ends and having a bead forming ridge adjacent the opposite end, said fingers being spaced resilient members, the ridge ends being urged toward each other whereby the fingers at the ridge end are closer together than the fingers at the joined end, and a plunger secured to said link and extending between said fingers, said plunger having means thereon for spreading apart said fingers when the fingers and plunger are moved relatively to each other.

4. In a device for forming beads on tubes extending through holes in a header or the like, the beads to be formed on each side of the header, the combination of a yoke member, a die actuating shaft slidably mounted in said yoke, actuating means pivoted to said joke and having a cam member movable to move said shaft in a direction away from the pivot, resilient means urging said shaft toward said pivot, a link pivoted to said pivot and extending within said shaft, a positioning member secured to said shaft, and a quill disposed within said positioning member, said quill comprising a die member secured to said shaft, said die member being composed of die fingers integrally connected adjacent one of their ends and having a bead forming ridge adjacent the opposite end, said fingers being spaced resilient members, the ridge ends being urged toward each other whereby the fingers at the ridge end are closer together than the fingers at the joined end, and a plunger secured to said link and extending between said fingers, said plunger having means thereon for spreading apart said fingers when the fingers and plunger are moved relatively to each other by movement of the die actuating shaft.

5. In a device for forming beads on tubes extending through holes in a header or the like, the beads to be formed on each side of the header, the combination of a yoke member, a die actuating shaft slidably mounted in said yoke, actuating means pivoted to said yoke and having a cam member movable to move said shaft in a direction away from the pivot, resilient means urging said shaft toward said pivot, a link pivoted to said pivot and extending within said shaft, a positioning member secured to said shaft, and a quill disposed within said positioning member, said quill comprising a die member secured to said shaft, said die member being composed of die fingers integrally connected adjacent one of their ends and having a bead forming ridge adjacent the opposite end, said fingers being spaced resilient members, the ridge ends being urged toward each other whereby the fingers at the ridge end are closer together than the fingers at the joined end, and a plunger secured to said link and extending between said fingers, said plunger having a cam end disposed beyond the ridge end of said fingers and movable toward said fingers by movement of the die actuating shaft to spread apart said fingers.

6. In a device for forming beads on tubes extending through holes in a header or the like, the beads to be formed on each side of the header, the combination of a hollow shaft comprising a housing member having a portion adapted to position the device with respect to the header, a member mounted in said housing member so that one of said members is movable with respect to the other, means for relatively moving one of said members with respect to the other, a quill disposed within said housing member, said quill comprising a die member secured to said housing member, said die member being composed of die fingers integrally connected adjacent one of their ends and having a bead forming ridge adjacent the opposite end, said fingers being spaced resilient members, the ridge ends being urged toward each other whereby the fingers at the ridge end are closer together than the fingers at the joined end, a plunger secured to the second named member, said plunger having means thereon for spreading apart said fingers when the fingers and plunger are moved relatively to each other, a yoke member connected to said second named member, and spring means between said hollow shaft and yoke member for returning said plunger to inoperative position to permit said fingers to move to unspread position.

7. In a device for forming beads on tubes, the beads to be formed on each side of a header, the combination of a quill comprising a plurality of die members, said members comprising fingers having bead forming means thereon adjacent one end thereof, said fingers being integrally connected adjacent the other end, said die members in inoperative position being collapsed whereby the bead forming ends of said die members are closer together than the other end and the external diameter of the bead forming members is then substantially less than the internal diameter of the tube to be beaded, a hollow shaft comprising a housing member surrounding said quill and for receiving the end of the tube to be beaded and positioning it with respect to said die members and with respect to the header, means for separating said die members to form the beads in the tube, said last named means including a member mounted in said hollow shaft and relatively movable with respect thereto and a cam plunger secured to said last named member, a yoke secured to said last named member, and spring means between said hollow shaft and yoke for returning said cam plunger to inoperative position whereby said die members return to inoperative position.

8. In a device for forming beads on tubes to fasten them to a header or the like, the combination of a quill comprising a plurality of fingers terminating in die members, the external contour of which substantially corresponds to the internal contour of the tube after beading, the fingers being contracted to a position where the external diameter of the bead forming dies is substantially less than the internal diameter of the tube to be beaded, said fingers being resilient and by their resilience being urged toward contracted position, a hollow shaft comprising a housing member surrounding said quill for positioning the die members with respect to the tube to be beaded by engaging the header, means for separating said die members to form the beads in the tube, said last named means including a member mounted in said hollow shaft and relatively movable with respect thereto and a cam plunger secured to said last named member, a yoke secured to said last named member, and spring means between said hollow shaft and yoke for returning said cam plunger to inoperative position whereby said die members return to inoperative position.

KENLY C. BUGG.
HARRY L. HART.